United States Patent
Chmiel et al.

(10) Patent No.: US 6,458,186 B1
(45) Date of Patent: Oct. 1, 2002

(54) METHOD FOR REGENERATING ELECTRICALLY CONDUCTING ADSORBENTS LADEN WITH ORGANIC SUBSTANCES

(75) Inventors: Horst Chmiel; Egbert Schippert; Cornelia Möhner, all of Saarbrücken (DE)

(73) Assignee: M+W Zander Facility Engineering GmbH, Stuttgart (DE)

( * ) Notice: Subject to any disclaimer, the term of this patent is extended or adjusted under 35 U.S.C. 154(b) by 0 days.

(21) Appl. No.: 09/899,578

(22) Filed: Jul. 5, 2001

(30) Foreign Application Priority Data

Jul. 6, 2000 (DE) .......................... 100 32 385

(51) Int. Cl.$^7$ ............................... B01D 53/04
(52) U.S. Cl. ..................... 95/115; 95/141; 95/148
(58) Field of Search ................ 95/26, 90, 114, 95/115, 141, 143, 148; 96/143

(56) References Cited

U.S. PATENT DOCUMENTS 3,608,273 A * 9/1971 Fabuss et al. ................ 95/148
4,737,164 A * 4/1988 Sarkkinen ..................... 95/141
5,628,819 A * 5/1997 Mestemaker et al. ......... 96/122
5,827,355 A * 10/1998 Wilson et al. ................ 55/527
5,912,423 A * 6/1999 Doughty ...................... 95/107
6,364,936 B1 * 4/2002 Rood et al. ................... 95/115

FOREIGN PATENT DOCUMENTS

DE          195 13 376       10/1996
DE          41 04 513        11/1996

* cited by examiner

Primary Examiner—David A. Simmons
Assistant Examiner—Frank M. Lawrence
(74) Attorney, Agent, or Firm—Gadrun E. Huckett

(57) ABSTRACT

In a method for regenerating an electrically conducting adsorbent laden with organic substances the adsorbent is heated by passing electric current through the adsorbent while not passing a flushing gas through the adsorbent. Subsequently, the flushing gas is passed through the adsorbent while not heating the adsorbent by passing electric current through the adsorbent so that the adsorbed organic substances are flushed from the adsorbent and the adsorbent is simultaneously cooled by the flushing gas.

9 Claims, 11 Drawing Sheets

METHOD FOR REGENERATING ELECTRICALLY CONDUCTING ADSORBENTS LADEN WITH ORGANIC SUBSTANCES

BACKGROUND OF THE INVENTION

1. Field of the Invention

The invention relates to a method for regenerating electrically conducting adsorbents laden with organic substances which are heated by passing electrical current therethrough.

2. Description of the Related Art

Methods for removing organic gaseous substances of exhaust gas streams by adsorption on adsorbents, in particular, activated carbon, have been used industrially for many years, for example, in devices for recovering solvents. In most cases, the activated carbon is in the form of solid beds of granular material. Less frequently, fiber-shaped activated carbon in the form of mats, for example, nonwoven, woven or knit fabrics, is used, wherein the fabrics are wound to annular adsorbers or clamped into a frame construction. The entire process of exhaust gas cleaning by adsorption is carried out in general in three main steps: the loading step, the regeneration step, and the cooling step. During the loading step, the exhaust gas to be cleaned is passed through the adsorbent material and the organic substances are adsorbed during this process in the inner pore structures of the adsorbent material. During the course of loading, the loading front migrates in the flow direction through the adsorber. When the adsorbent material at the end of the adsorber, viewed in the flow direction, is loaded such that the clean gas concentration that exits the adsorber has reached a preset limit value, the loading process of this adsorber is terminated and the gas flow is switched to another freshly regenerated adsorber. For economic reasons, it is generally desirable to regenerate the laden adsorbent. However, many cases are known in which a regeneration is not possible or it is not economical. This is particularly the case when the concentration of the organic substances is very small, as is the case for intake air of buildings or the circulating air of air conditioning systems of buildings. In these cases, the laden adsorbent is disposed of and is replaced with new adsorbent material.

Since the adsorption is a reversible process, the adsorbed organic substances can be removed from the adsorbent material in a regeneration step by changing the equilibrium conditions. This can be achieved, for example, in that the adsorbent material is heated and the adsorbed organic substances are then removed from the adsorbent by means of a flushing gas stream. This method is, for example, employed in activated carbon adsorption devices which are regenerated with steam (water vapor) or inert gas. In both cases, the flushing gas serves at the same time as a heating medium for the adsorbent. Heating of the adsorbent and desorption of the organic substances are thus coupled in an un-separable way. Because of this indirect heating of the laden adsorbent with the flushing gas very large volume streams of the flushing gas are required. In the case of regeneration with steam, the steam, after exiting from the adsorber, must be condensed together with the desorbed organic substances that have been removed from the adsorbent. The resulting condensate must be regenerated in complicated processes, for example, by rectification such that water and organic substances are separated from one another. The inert gas regeneration in which the inert gas is generally nitrogen, is even more complex than the steam regeneration because the nitrogen is circulated through the adsorber and the nitrogen must then be cooled to very low temperatures in a condensation step in order for the desorbed organic substances to be condensed and for the residual loading of the adsorbent at the end of the regeneration step to be so low that the desired clean gas concentration can be maintained in the subsequent loading step.

Since the heating of the adsorbent by the inert gas as a result of its minimal heat capacity occurs only very slowly and since large flow velocity, which must be between 0.1 and 0.5 m/s, are required, enrichment or concentration factors (=maximum regenerating gas concentrations/crude gas concentration) of only approximately 40 can be achieved with this method. An already significant improvement can be achieved when the adsorbent is not heated indirectly by the flushing gas but directly by passing electrical current therethrough. In this case, as a result of decoupling of the processes heating and flushing, the flushing gas amount can be significantly reduced, and significantly higher enrichment factors can be achieved.

From German patent application 195 13 376 A1 a device for recovering organic solvents is known which is comprised of an annular solid bed filled with granular activated carbon and electrically heatable, which, for adsorption of the solvent, is first loaded with the exhaust gas stream and is subsequently loaded with the regenerating gas for desorption or regeneration. In this device, the outer and inner mantle of the annular solid bed is comprised of a metal grate which forms the electrodes. With this method, enrichment factors of 120 can be achieved and the required flushing gas volume stream can thus be reduced to 5–10% of the crude gas volume streams. With the very small specific gas amounts relative to the inflow surface area of the carbon bed against which the gas streams flow, the required uniform loading of the carbon with the flushing gas, which is required for a good regeneration, can be achieved only when it is carried out centrally in the interior of the adsorber, for example, by a distribution tube with numerous fine bores. A disadvantage in regard to the service life for loading and the quality of the clean gas concentrations in this method is that the regenerating gas flow itself is heated by the activated carbon and that, for a regeneration from the interior to the exterior, the carbon has a significantly reduced regeneration temperature in the innermost carbon layer as compared to the outer layers. As a result of this, the innermost carbon layer is regenerated only insufficiently, and therefore it is not possible to achieve very low clean gas concentrations during the loading step of, for example, a few $\mu g/m^3$ as required, for example, for the intake air for clean rooms.

From German patent document 41 04 513 C2 an adsorber is known which is also heated directly with electrical current and which is characterized in that the adsorbent material is in the form of fibrous activated carbon which is, for example, in the form of mats. One embodiment of such an adsorber is schematically illustrated in FIG. 1. The filter frame contains 5 to 15 layers of ACF (activated carbon fiber) fabric of 250 $g/m^2$ per layer. At the top of the frame an electrical power supply of 220 V and 15 kW is provided and the bottom of the frame is connected to ground, while the vertical lateral frame parts are insulating. Crude gas (wide arrow) passes from the left to the right through the filter at 3,500 $m^3/h$ with a load of 100 $mg/m^3$ at the inlet side and exits at the outlet side with a load of <1 $mg/m^3$ at 3,500 $m^3/h$. The regenerating gas (narrow arrow) flows from the right to the left through the filter at 50 $m^3/h$ and exits to the left at 200° C., 50 $m^3/h$ with a maximum load of 150,000 $mg/m^3$.

Several of these frames can be switched together air flow-technically and electrically for the treatment of larger exhaust gas amounts in numerous sensible arrangements. Because of the very quick electrical heating of the fabric which can be achieved in less than a minute, very high enrichment factors of up to 1,500 can be achieved which are advantageous when, for example, solvents are to be recovered.

A disadvantage is that a large expenditure must be provided in order to distribute the regenerating gas uniformly across the filter surface. For example, the regenerating gas velocity relative to the filter surface in the above example of a 1 m×3 m filter is only 0.01 m/s. For this flow velocity a pressure loss of only 10 Pa results across, for example, five layers of activated carbon fiber (ACF) fabric so that, at the time when the regenerating gas impacts on the filter, the gas must already be uniformly distributed. This can be achieved, for example, by a system of distribution pipes with numerous bores distributed across the height and the cross-section from which the regenerating gas exits as an open jet (FIG. 2).

For a large quantity of air to be treated, i.e., a plurality of filter frame modules, either a large number (3×number of filter frames) of distribution pipes must be installed or the spacing between a distribution pipe and the filter must be very large (0.87 m); this enlarges the construction volume of the apparatus to an uneconomical size.

Moreover, it is disadvantageous that in this method of electrical regeneration the desorption gas heating is also carried out by heat transfer from the electrically heated fabric onto the air, resulting in the above described negative results in regard to the efficiency of the exhaust gas cleaning method caused by the formation of a temperature gradient. When using activated carbon fiber fabric, this has, as shown in FIG. 3, an even stronger effect because of the minimal amount of employed carbon in comparison to granular carbon, where it is necessary for the treatment of the same amount of exhaust gas to employ an amount of active carbon that is more than 100 times greater. The result of such a great temperature gradient is that during regeneration the first fabric layers viewed in the regeneration direction, which are especially important for the fine cleaning of the exhaust gas, are not optimally regenerated which results in a shortening of the service life for loading and in a decrease of the achievable clean gas concentrations during the subsequent loading step. This negative effect is, of course, the stronger the higher the regenerating gas velocity.

As can be taken form the following table, a further disadvantage at higher desorption gas velocities is that the required electrical heating power increases drastically with increasing desorption gas velocity. This has the consequence that, for economical reasons, the regenerating gas velocities are kept as low as possible for electrically regenerated adsorbers made of activated carbon fiber material, which in turn, requires the installation of a complex regenerating gas distribution system.

| Electrical Power Output for the Regeneration of Activated Carbon Fiber Fabric as a Function of the Regenerating Gas Velocity | | | | | | |
| --- | --- | --- | --- | --- | --- | --- |
| desorption gas velocity [cm/s] | 0 | 1 | 2 | 5 | 10 | 20 |
| total electrical heating power [kW/m$^2$] | 3.1 | 5.2 | 7.5 | 14.4 | 26.2 | 49.4 |

Finally, in this method it is a disadvantage that the control of the temperature of the activated carbon fabric, which is also of utmost importance for safety-technological reasons for the practical use of the method, is very difficult. The reason for this problem resides inter alia in that the thermal conductivity and the heat capacity of the activated carbon fiber material is very low so that conventional methods of temperature measurement, for example, by means of electrically insulating thermoelements, react only with great time delay and, moreover, the measured value is strongly flawed because it is dependent on how good the (accidental) mechanical contact between the thermoelement and the fabric is. Since the heating duration of the fabric from room temperature to, for example, 200° C., requires only approximately one minute and, moreover, the electrical resistance of activated carbon fabric has a negative temperature coefficient, there is a great risk of overheating of the activated carbon fabric connected with this method.

In both known electric regeneration methods of adsorbents a cooling step follows in which the adsorbent is cooled to a temperature which is required for the subsequent loading step by passing air or inert gas through the adsorbent.

SUMMARY OF THE INVENTION

It is an object of the present invention to provide a method for electrical regenerating electrically conducting adsorbents, in particular, of activated carbon fiber fabrics, which, on the one hand, provides the benefits of electrical regeneration in comparison to conventional regeneration methods, i.e., inert gas regeneration and steam regeneration, such benefits including:

very short desorption periods;

very short heating periods;

very great enrichment factors for the regeneration;

if needed, regeneration temperatures up to 300° C.;

in the case of fiber-shaped adsorbents, extremely quick kinetics of the material transfer from the gas to the adsorbent phase;

good economic efficiency because in the electrical regeneration methods only the activated carbon and the regenerating gas but no pipelines, containers, or other apparatus parts must be heated;

but does not exhibit the disadvantages of conventional electrical regeneration methods for adsorbents as described above and, accordingly, in particular:

makes possible also large desorption gas velocities of substantially more than 2 cm/s without the connected load for heating the adsorbent being substantially greater than for desorption gas velocities under 1 cm/s; this is particularly desirable when the regenerating gas is air and this regenerating air must not be further cleaned, for example, in the case of cleaning the intake air of buildings from the gaseous substances contained in the ambient air;

requires no complex device for the uniform distribution of the regenerating gas across the inflow surface of the filter so that, on the one hand, the apparatus expenditure for this distribution device is eliminated and, on the other hand, the space requirement of such filters in comparison to the conventional configuration is considerably reduced;

provides an intrinsically safe regeneration method with regard to overheating or burning of the activated carbon fiber, i.e., no temperature control of the electrical power is required.

In accordance with the present invention, this is achieved in that alternatingly and temporally successively with respect to time the adsorbent is heated by passing electrical current therethrough, wherein no flushing gas stream is guided through the adsorbent, and, subsequently, with the electrical current being turned off, a flushing gas stream is guided through the adsorbent so that at the same time the adsorbed organic substances are removed and the adsorbent is cooled.

Preferably, the two steps of heating and desorbing/cooling are performed temporally successively several times.

Advantageously, the step of heating is carried out for a preset period of time.

The preset period of heating is calculated such that it corresponds to the time which is minimally required in order to heat, for a preset electrical heating power, the completely unladen adsorbent to a predetermined maximum temperature.

Preferably, the empty pipe velocity through the adsorbent is 0.1 to 0.5 m/s.

The adsorbent is preferably comprised of fiber-shaped activated carbon in the form of nonwoven, woven or knit fabrics.

The preset periods of time are selected such that the adsorbed mixtures are successively desorbed and collected according to their volatility.

DESCRIPTION OF THE PREFERRED EMBODIMENTS

The following embodiment of the invention is based on experimental results obtained with a device with which all inventive features have been realized.

In a laboratory apparatus sized for air quantities of 0–30 m$^3$/h experiments with regard to adsorption and desorption realized with the inventive interval desorption method were performed.

Figure 1:
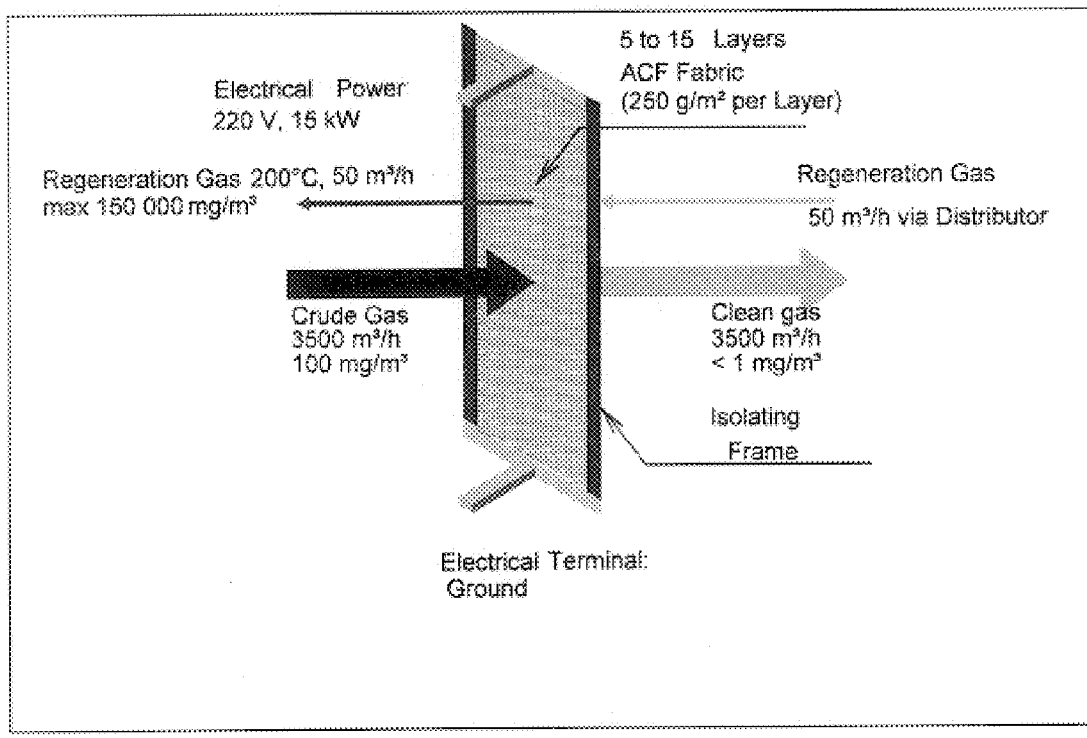
FIG. 1 illustrates the principle of electrical regeneration of ACF (activated carbon fiber) fabric in a module configuration according to the prior art.
Figure 2:
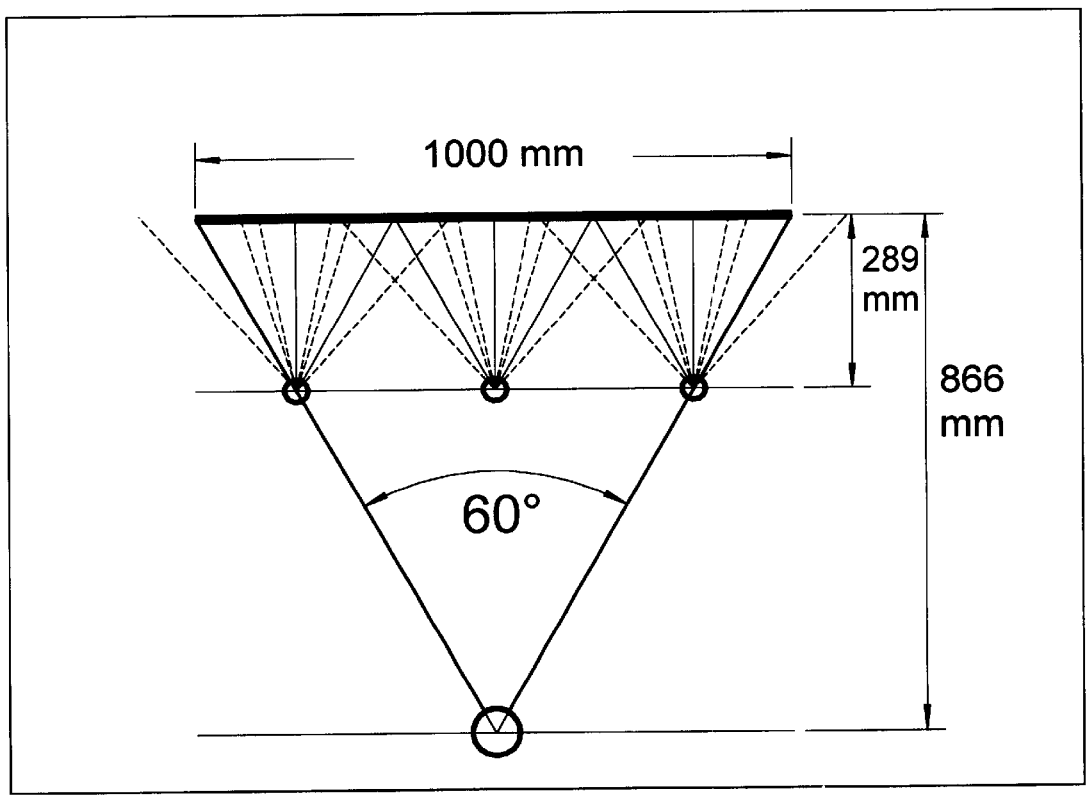
FIG. 2 shows a distribution system with measurements according to the prior art.
Figure 3:
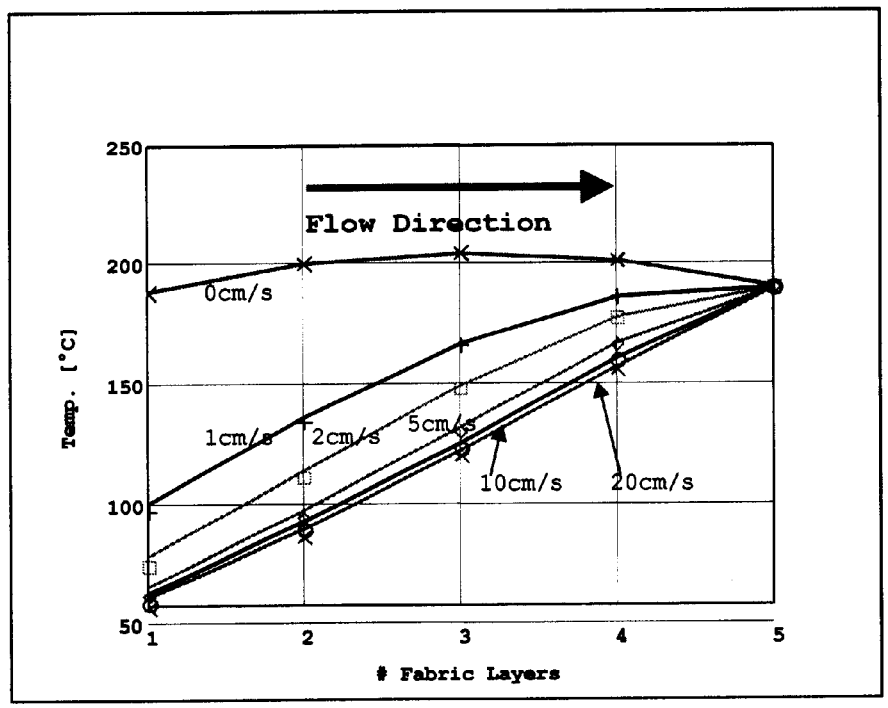
FIG. 3 shows the temperature of the activated carbon fiber fabric layers as a function of the regenerating gas velocity at a preset temperature of the fifth layer of 190° C.
Figure 4:
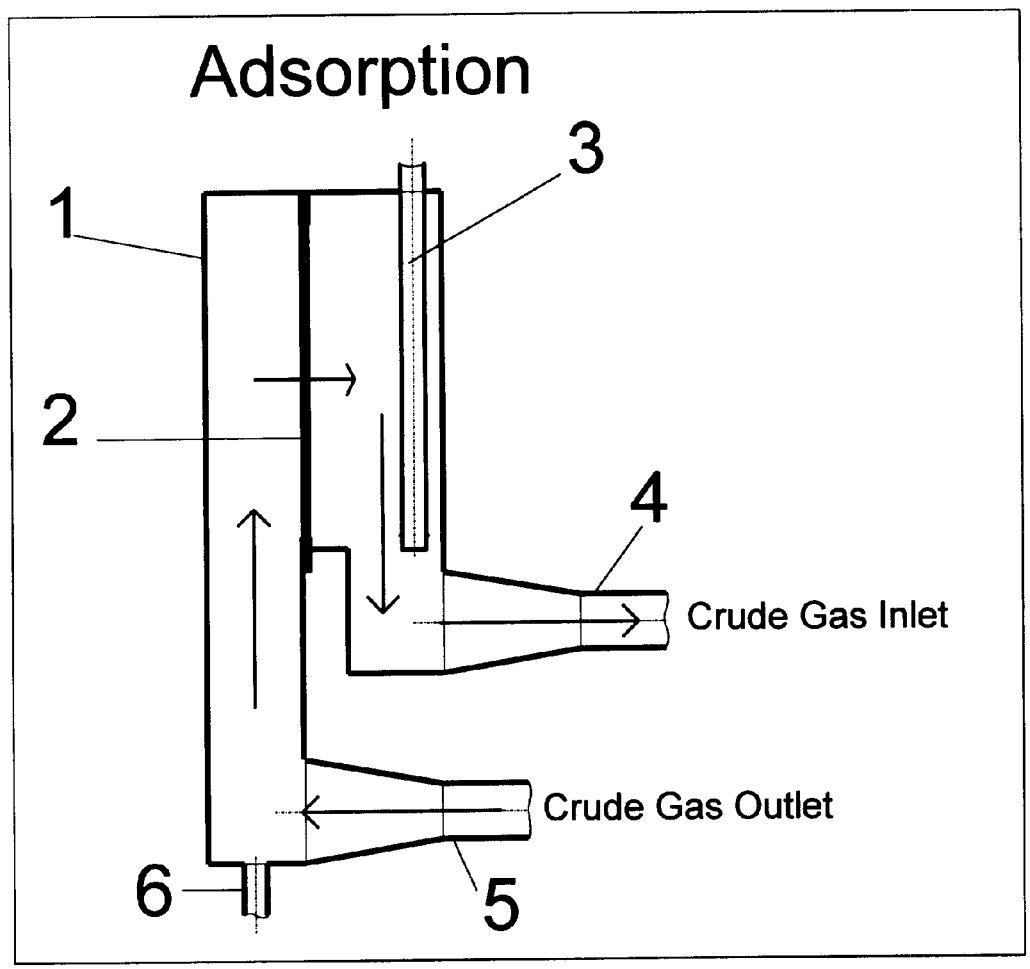
FIG. 4 is a section view of the adsorber according to the present invention during the adsorption phase.

As illustrated in FIG. 4, the loading in the laboratory adsorber 1 is carried out in the illustrated direction from the crude gas line 5 via the filter 2 to the clean gas line 4 wherein five layers of activated carbon fabric (ACF) are clamped within the filter frame. The supply and removal lines 3 and 6 are closed during the loading phase. The loading concentration was selected to be approximately 40 mg/m$^3$ for the solvent toluene wherein the relative humidity of the crude gas at a temperature of 23° C. was maintained at a value of 50%.

Figure 5:
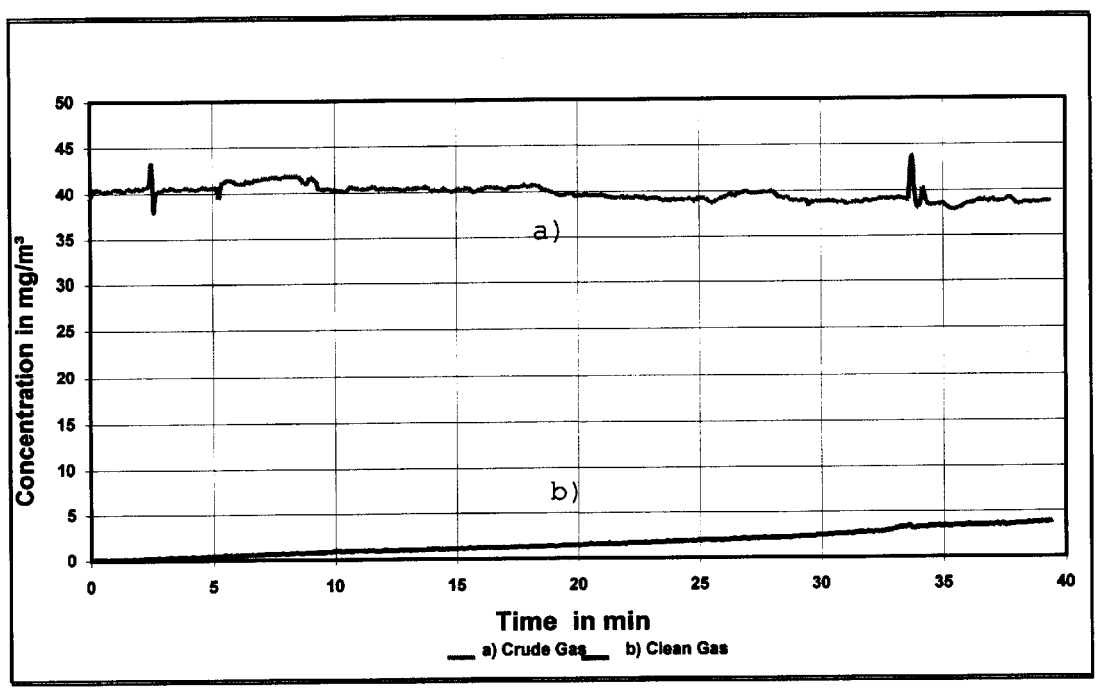
FIG. 5 illustrates the breaking-through curve for toluene when using five layers of activated carbon filter at 0.3 m/s and 50% humidity.

The velocity at the filter, whose free filter surface had a size of 0.07 m width and 0.21 m height, was 0.3 m/s. The experiments were carried out up to a breaking-through concentration of 10% of the crude gas concentration (FIG. 5). The selected breaking-through concentrate was 4 mg/m$^3$ which was reached approximately after 40 minutes.

Figure 6:
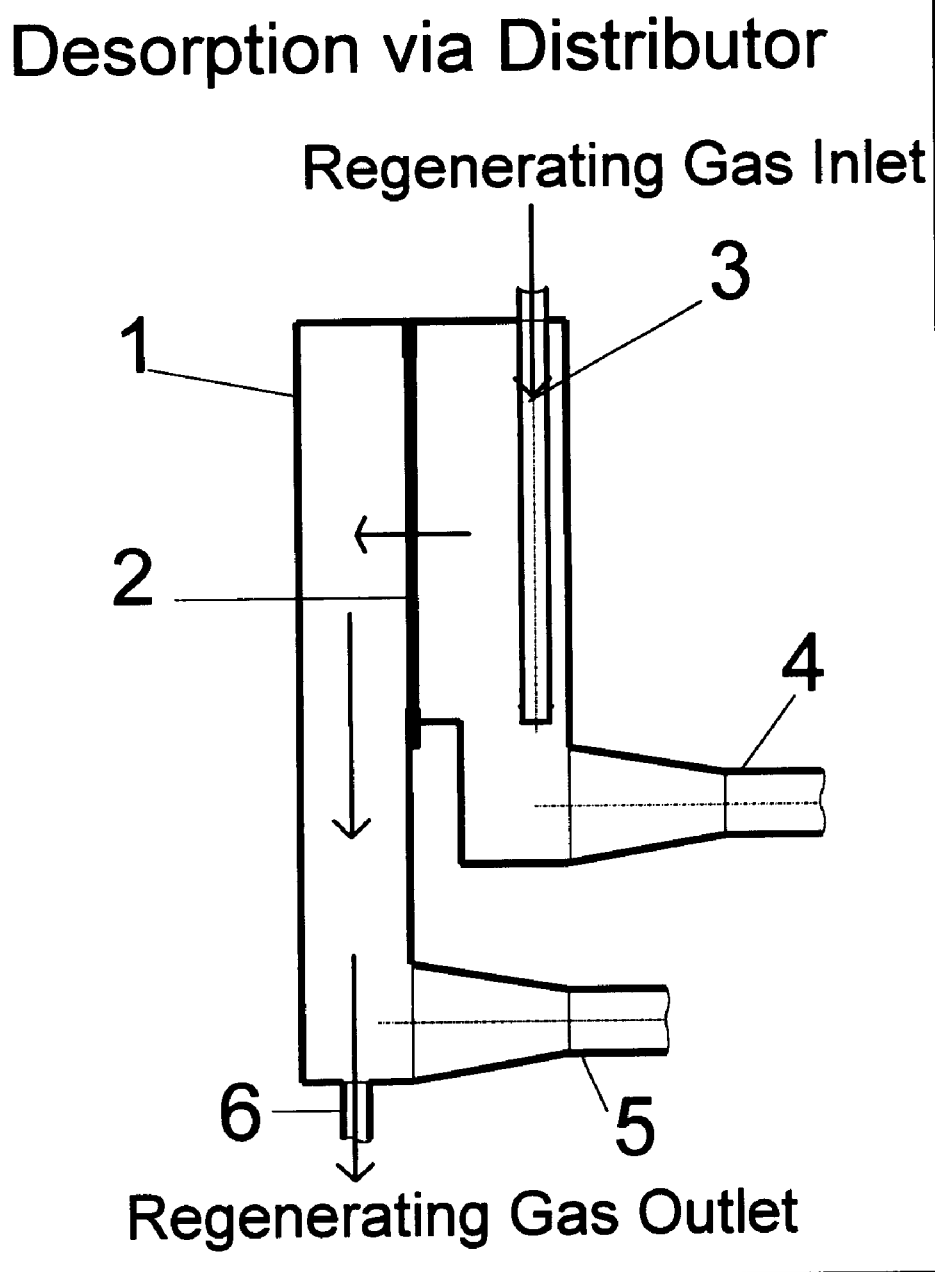
FIG. 6 is a schematic illustration of the desorption step by means of a distribution pipe system.
Figure 7:
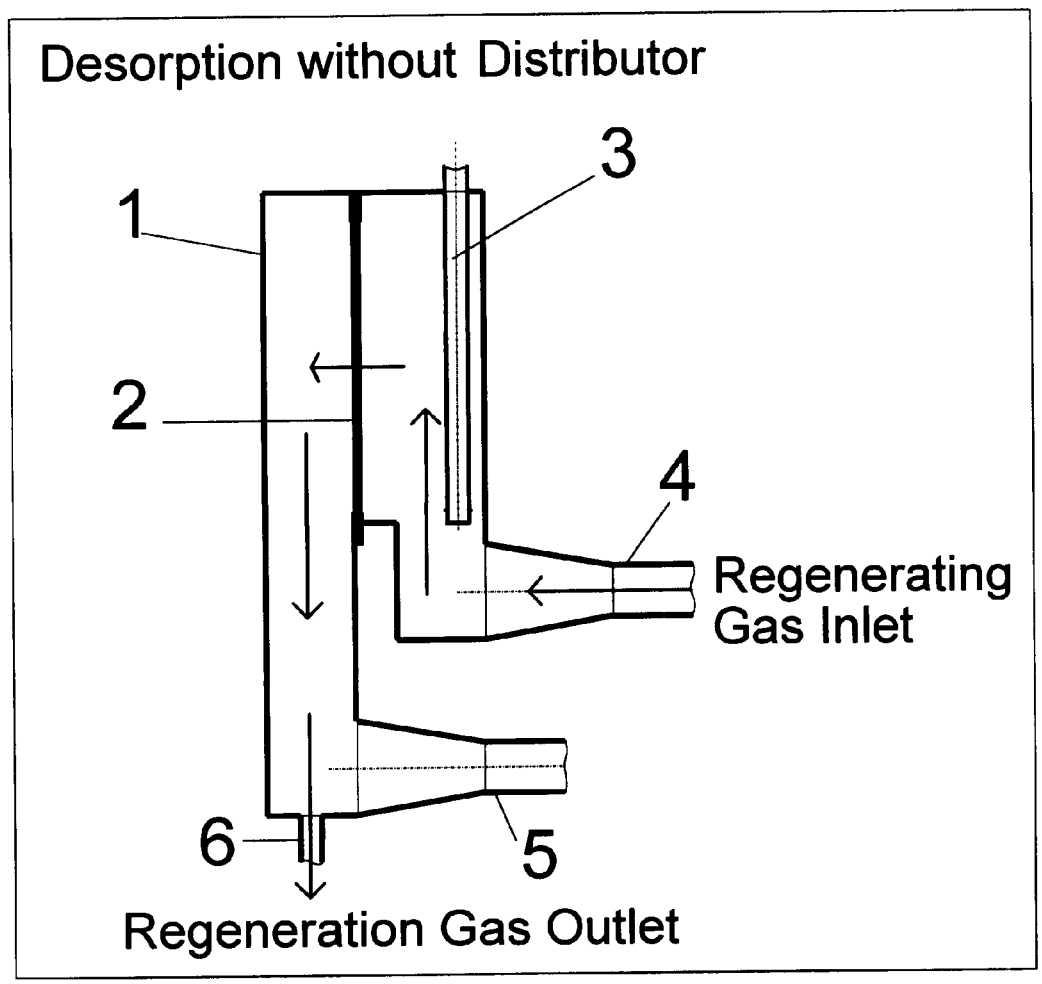
FIG. 7 is a schematic illustration of the desorption step without using the distribution pipe system.

During the subsequent desorption, the air supply was carried out in the opposite direction to the adsorption, wherein, as a function of the gas velocity either via the desorption pipe 3 or the regular pipeline 4, the desorption gas was introduced (FIGS. 6 and 7). The regenerating air was removed via the regenerating air line 6. During the entire regeneration, which is comprised of the two partial steps heating and desorption, the crude gas line 5 is always closed.

Measurement of the temperature during the desorption was carried out by means of infrared measurement contactless at the filter surface and with specially prepared thermoelements between the filter layers.

The cycled desorption was carried out as follows (FIGS. 8 to 11):

Heating of the filter material by direct electrical heating with constant power supply over a time period of 2.5 minutes. The valves at the adsorber were closed.

After 2.5 minutes the electrical power supply was terminated, the valves were opened at the adsorber, and gas was passed through the filter for 0.5 minutes. During this time period, the transport of the desorbed solvents and of the desorbed water as well as a temperature reduction at the filter took place. After 0.5 minutes the valves of the adsorber were closed.

Heating of the filter material by direct electrical heating at constant power supply over a time period of 2.5 minutes.

This temporal cycling and course of the method for heating and passing through the gas were carried out a total of seven times, subsequently the process was terminated, and a further adsorption process could begin.

FIGS. 8 through 11 show the experimental results in graphic form for the power input, regenerating gas amount, temperature course, and concentration, respectively.

Figure 8:
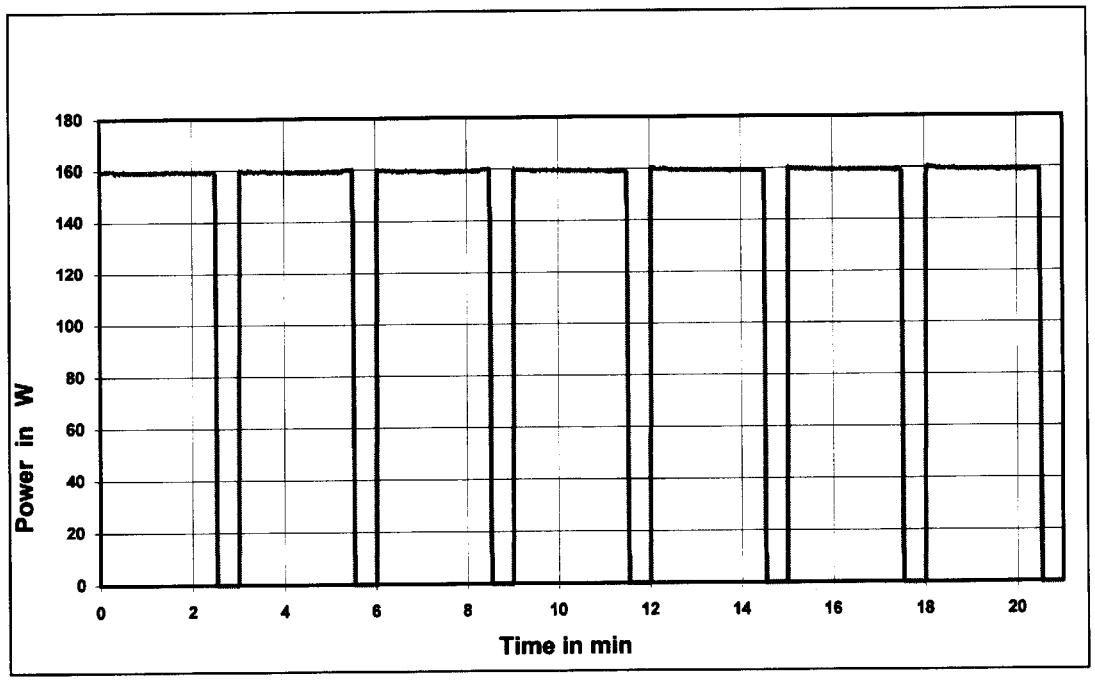
FIG. 8 illustrates the momentary power input during interval desorption cycled with 2.5 min. heating and 0.5 min. gas flow through the adsorbent.

FIG. 8 illustrates the momentary power input for heating during the interval desorption carried out with a cycle time of 2.5 min. for heating and 0.5 min. for gas flow through the adsorbent.

Figure 9:
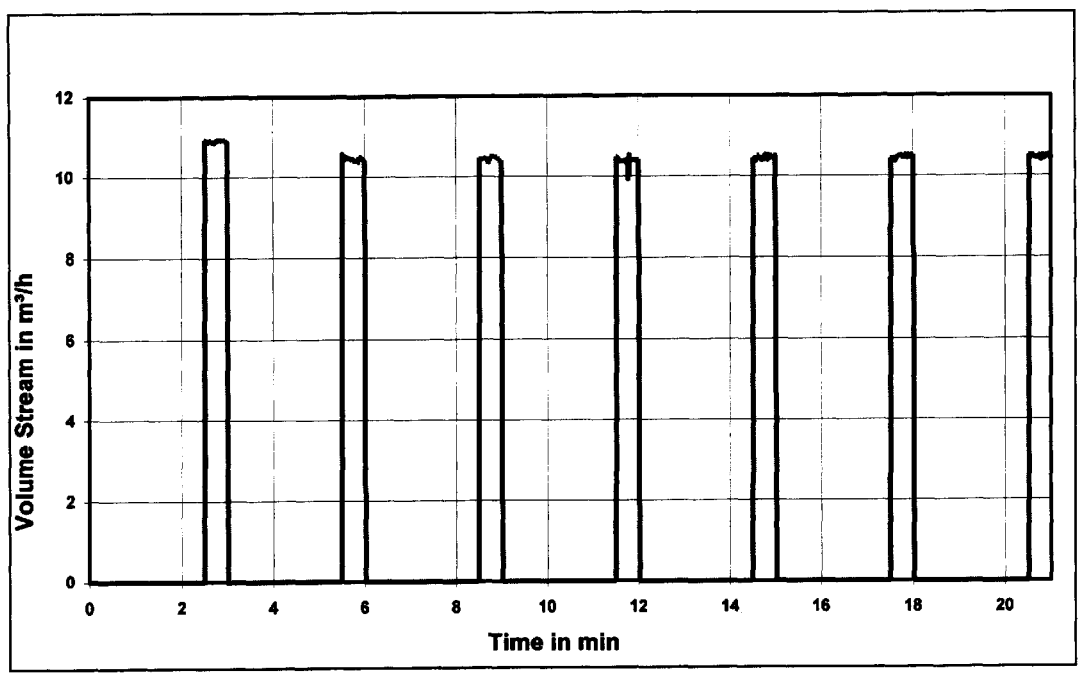
FIG. 9 shows the regenerating gas amount during the interval desorption.

FIG. 9 shows the regenerating gas amount during the course of the interval desorption carried out as described above.

Figure 10:
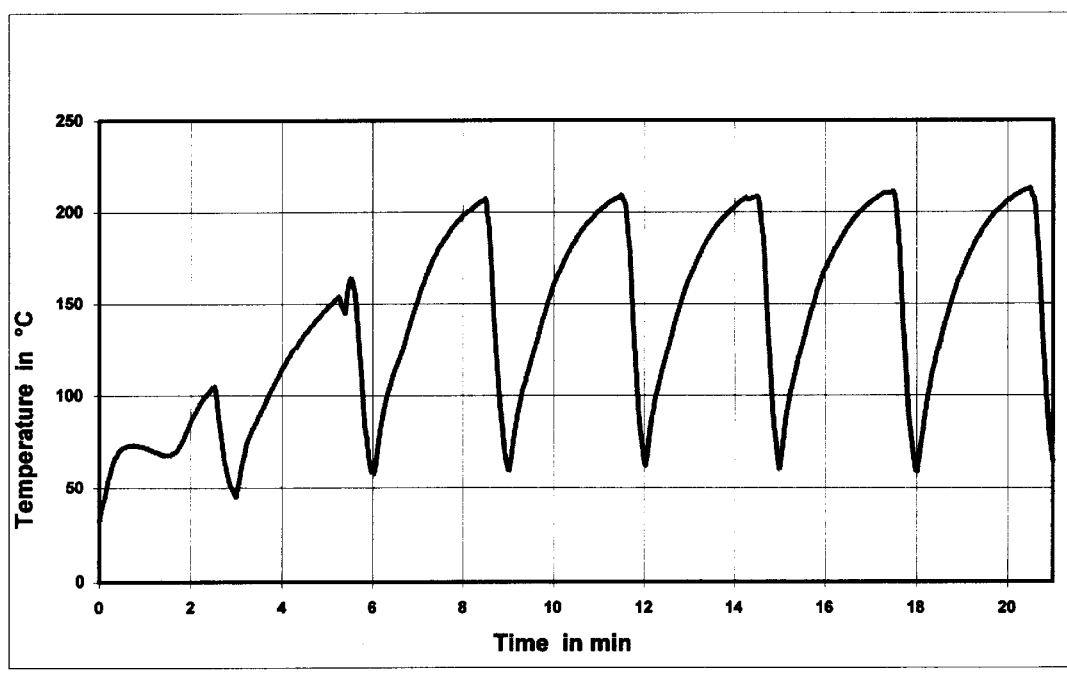
FIG. 10 shows the temperature course of the last layer in the flow direction during interval desorption, measured in a contactless manner.

FIG. 10 shows the temperature course of the last layer in the flow direction during interval desorption. The temperature was measured in a contactless manner as described above.

Figure 11:
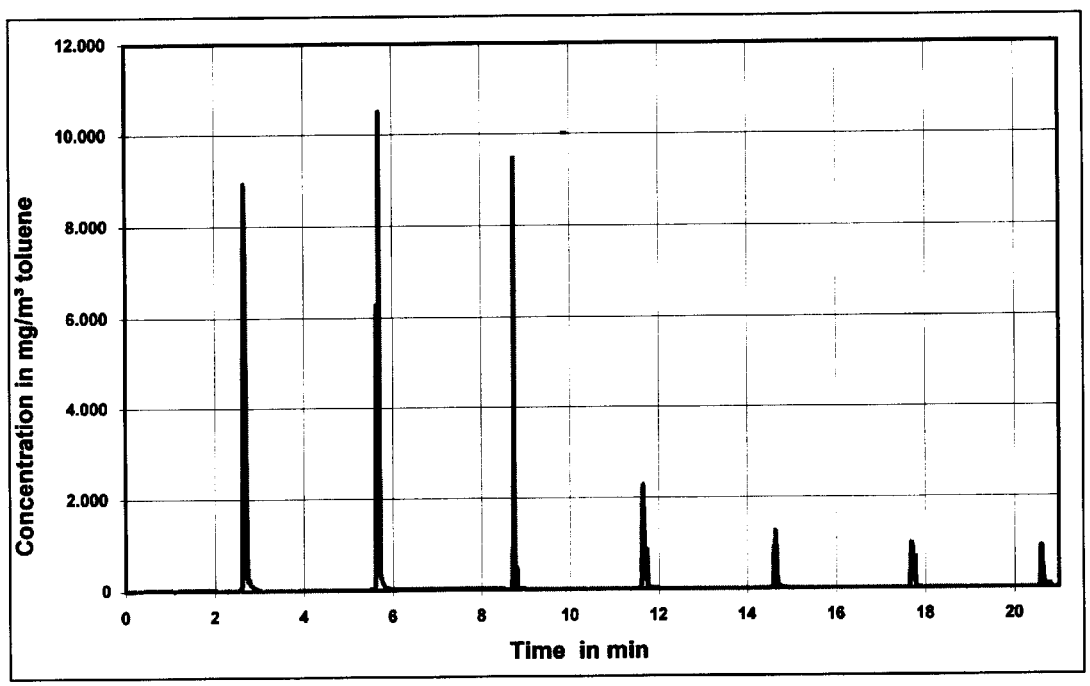
FIG. 11 shows the concentration course of the interval desorption when changing between heating and flow-through intervals for a power input of $P_{el}$ of 160 W=10 kW/m$^2$ and a desorption speed of 0.2 m/s with a crude gas concentration during adsorption of 40 mg/m$^3$ and a relative humidity of 50%.

FIG. 11 shows the concentration course of the interval desorption when changing between heating and flow-through intervals for a power input of $P_{el}$ of 160 W=10 kW/m² and a desorption speed of 0.2 m/s with a crude gas concentration during adsorption of 40 mg/m³ and a relative humidity of 50%.

The minimal temperatures that were achieved on the filter by the first two intervals during heating are the result of the primarily occurring desorption of the adsorbed water on the activated carbon fabric (ACF). Beginning with the third interval, the stationary temperatures for the corresponding power supply and time were obtained.

Surprisingly, it was found that with this interval regeneration of the activated carbon fiber material with only seven intervals almost a complete desorption could be obtained even though during the actual desorption time, which is identical with the cooling time, no electrical heating power was supplied and even though this time was very short, for example, only 30 seconds for a regenerating air velocity of 20 cm/s, and even though in this time period the temperature of the activated carbon fiber fabric was lowered from initially 220° C. to approximately 40° C. In the subsequent loading phase the same service life was obtained. This shows that a stationary state was present, i.e., that the interval desorption achieves the desorption of the same amount of toluene as had been adsorbed in the loading phase.

Surprisingly, and very advantageously for the suggested method, it was also found that for the regeneration method according to the invention the regenerating gas velocity within wide ranges practically has no effect on the desorption quality, the consumption of electrical energy, the electrical power and the clean gas quality during the subsequent loading phase, when the number of desorption intervals was unchanged. This can be taken form the following table.

| Regenerating Gas Velocity [cm/s] | 5 | 10 | 20 |
|---|---|---|---|
| regenerating gas distributor | yes | no | no |
| number of desorption intervals | 7 | 7 | 7 |
| electrical heating power [kW] | 0.16 | 0.16 | 0.16 |
| energy per desorption interval [kJ] | 24 | 24 | 24 |
| maximum desorption gas concentration [g/m³] | 10.2 | 11.5 | 10.5 |
| crude gas concentration [mg/m³toluene] | 40 | 40 | 40 |
| relative humidity [%] | 50 | 50 | 50 |
| clean gas concentration at the beginning of the following loading phase [mg/m³ toluene] | 0.1 | 0.18 | 0.13 |
| Regenerating Gas Velocity [cm/s] | 5 | 10 | 20 |
| service life up to the point of breaking-through concentration of 10% of the crude gas concentration [min] | 44 | 39 | 40 |

While specific embodiments of the invention have been shown and described in detail to illustrate the inventive principles, it will be understood that the invention may be embodied otherwise without departing from such principles.

What is claimed is:

1. A method for regenerating an electrically conducting adsorbent laden with organic substances, the method comprising the steps of:

a) heating the adsorbent by passing electric current through the adsorbent while not passing a flushing gas through the adsorbent;

b) subsequently, passing the flushing gas through the adsorbent while not heating the adsorbent by passing electric current through the adsorbent so that the adsorbed organic substances are flushed from the adsorbent and the adsorbent is simultaneously cooled by the flushing gas.

2. The method according to claim 1, wherein the steps a) and b) are alternatingly repeated several times.

3. The method according to claim 2, wherein the step a) is carried out for a preset period of time.

4. The method according to claim 3, further comprising the step of calculating the preset period of time such that the period of time is the amount of time of heating the completely unladen adsorbent at a preset electric heating power to a preset maximum temperature.

5. The method according to claim 3, wherein the preset period of time for the repeated steps a) is selected such that the organic substances having different volatility are successively desorbed and collected according to the volatility.

6. The method according to claim 1, wherein the empty tube velocity he adsorbent is 0.1 m/s to 0.5 m/s.

7. The method according to claim 1, wherein the adsorbent is comprised of fibrous activated carbon in the form of nonwoven, woven, or knit fabrics.

8. The method according to claim 1, wherein the step a) is carried out for a preset period of time.

9. The method according to claim 8, further comprising the step of calculating the preset period of time such that the period of time is the amount of time of heating the completely unladen adsorbent at a preset electric heating power to a preset maximum temperature.

* * * * *